Jan. 5, 1937.  F. G. BEETEM  2,066,603
MEANS FOR CONTROLLING THE CHARGING VOLTAGE OF STORAGE BATTERIES
Filed Nov. 22, 1934
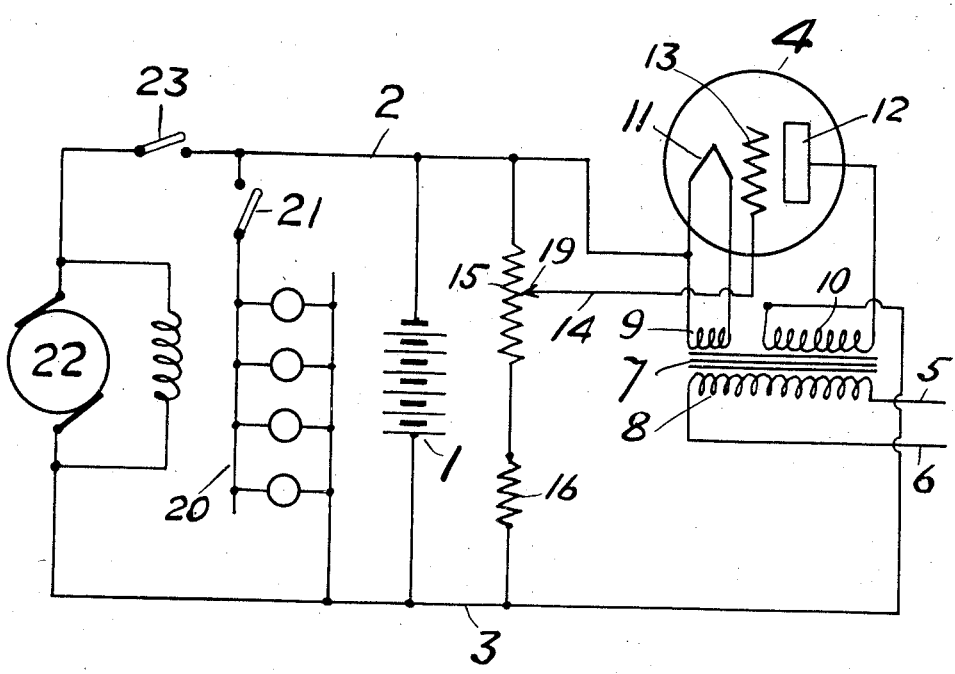
WITNESS:
INVENTOR
Frank G. Beetem
BY
Augustus B. Stoughton
ATTORNEY.

Patented Jan. 5, 1937

2,066,603

UNITED STATES PATENT OFFICE 2,066,603

MEANS FOR CONTROLLING THE CHARGING VOLTAGE OF STORAGE BATTERIES

Frank G. Beetem, Philadelphia, Pa., assignor to The Electric Storage Battery Company, Philadelphia, Pa., a corporation of New Jersey Application November 22, 1934, Serial No. 754,260

2 Claims. (Cl. 171—314)

The single figure of the accompanying drawing illustrates diagrammatically one embodiment of the invention.

The invention relates more particularly to a system in which a storage battery is connected to a source of alternating current through a rectifier, and one object of the invention is to maintain the voltage applied to the terminals of the battery at a constant value suitable for keeping the battery in a fully charged condition without excessive overcharge.

It is recognized that, even when not subjected to any discharge, a battery requires to be supplied with a small trickle charge current in order to compensate for local action and to maintain the battery in a fully charged condition. The current required for this purpose varies appreciably with changes of temperature of the battery, but it is found that, by maintaining the voltage at the battery terminals substantially constant at some predetermined voltage of suitable value, the proper trickle charge will be supplied over a comparatively wide variation of temperature.

When a battery is charged from an alternating current source through a rectifier, it is difficult to maintain the voltage across the battery terminals at a constant value without frequent manual adjustment. This invention provides automatic means for maintaining constant voltage at the battery terminals, and for this purpose a rectifier of the gas filled triode type is employed, the grid bias being controlled in response to very minute changes of voltage across the battery to counteract such changes.

The invention will be more clearly understood by reference to the accompanying drawing, in which is shown a battery 1 connected across the circuit 2, 3, to which current is supplied from the alternating current circuit 5, 6 by means of the transformer 7 and the gaseous triode rectifier 4. The transformer 7 is provided with a primary winding 8 connected to the A. C. circuit and with two secondary windings 9 and 10, of which winding 9 is connected to supply heating current to the cathode 11 and winding 10 is connected at one terminal to conductor 3 and at the other terminal to the plate 12 of the rectifier. The grid 13 of the rectifier is connected by conductor 14 to an intermediate point in the resistor 15, which resistor is connected across the circuit 2, 3. In series with the resistor 15 is connected a resistor 16 having special characteristics. One of these characteristics is an inverse current-resistance characteristic whereby the resistance decreases with increase of current passing through the resistor. Another characteristic is an inverse temperature-resistance characteristic whereby the resistance decreases with increase of temperature. These two characteristics are exhibited by the resistance material thyrite which is now on the market and is described in U. S. Patent No. 1,822,742 to Karl B. McEachron.

The characteristic of the gas filled triode 4 is such that the flow of current from the plate 12 to the cathode 11 is controlled by the negative bias of the grid 13. Under given conditions of filament temperature and plate voltage, the flow of current will be prevented by a certain negative bias on the grid 13, but, upon a small reduction in this negative bias, current will flow in the direction to charge the battery 1 during each half-cycle. The adjustment of the apparatus and circuits may be such that, when the voltage across the circuit 2, 3 is at the desired point to maintain the battery in a fully charged condition, the bias applied to the grid 13 will be suitable for delivering the necessary mean charging current to maintain this voltage at the battery terminals. If for any reason the voltage of the battery should increase slightly, the voltage drop between conductor 2 and the sliding contact 19 will increase, thus increasing the negative bias applied to the grid 13. If this increase is sufficient, the charging current will be interrupted until the voltage across the circuit 2, 3 has fallen to the original value, when the bias applied to the grid 13 will be reduced and the flow of charging current will be re-established. Thus the output of the rectifier will consist of a series of half-wave impulses maintained for certain periods of time separated by periods of complete interruption of current output and the mean value of charging current will be determined by the relative length of the two periods, which, in turn, will depend upon the grid bias as controlled by the battery voltage as described above.

The characteristic of the resistor 16 increases the sensitiveness of the control since any increase in current through the resistor 16 will lower its resistance, causing more current to flow through resistor 15 and therefore more voltage drop between conductor 2 and contact 19 than would have resulted if the resistance of resistor 16 were constant. It will be seen therefore that, by reason of the characteristic of resistor 16, less increase of voltage will be required across the circuit 2, 3 to interrupt the charging current, and the voltage across the battery 1 will be maintained more nearly constant.

It is a characteristic of some gas-filled triode rectifiers that their critical grid control voltage changes with the change of ambient temperature, this control voltage becoming more negative the higher the temperature, which is undesirable in the application herein described. The temperature characteristic of the resistor 16, whereby its resistance decreases with increase of ambient temperature, will tend to counteract this effect since a decrease in temperature and a corresponding decrease in the resistance of resistor 16 will permit more current to flow through resistor 15, thereby increasing the drop between conductor 2 and contact 19. This produces an increase in the negative bias applied to grid 13, tending to reduce the mean flow of current, thus counteracting the effect of increased ambient temperature on the control of the rectifier.

In the diagram there is shown a load circuit 20 which may be connected across the circuit 2,3 by means of the switch 21. There is also shown a generator 22 which may be connected across the circuit 2, 3 by the switch 23. If the load on the load circuit 20 is comparatively small, it may be supplied by the rectifier 4 in addition to the charging current furnished to the battery. The increase in mean output of the rectifier 4 to take care of this load when it is thrown on, and the corresponding decrease required when the load is disconnected, will be automatically effected by the slight variation in voltage across the circuit 2, 3 and the resulting change in the bias applied to the grid 13 as described above. If the load of the load circuit 20 is greater than the capacity of the rectifier 4, the generator 22 may be connected to supply this increased load by closing the switch 23. The regulating function of the rectifier 4 as described will still be effective in maintaining constant voltage across the battery 1.

It will be obvious to those skilled in the art to which the invention relates that modifications may be made in details of construction and arrangement in matters of mere form without departing from the spirit of the invention which is not limited in respect to such matters or otherwise than as the prior art and the appended claims may require.

I claim:—

1. In combination a storage battery, a charging means therefor including a source of A. C. current and a gas filled thermionic rectifier provided with filament, grid and plate electrodes, connections for applying A. C. potentials to the filament and plate electrodes, a circuit connected across the battery including in series a fixed resistor and a resistor having an inverse current-resistance characteristic, a connection to the positive terminal of the battery from that terminal of the filament which is most negative when the plate potential is positive, and a connection from the grid to an intermediate point in the resistance circuit.

2. In combination an alternating current source and a storage battery with automatic means for maintaining constant voltage at the battery terminals comprising a rectifier of the gas filled triode type through which the battery is charged, and means substantially independent of the A. C. voltage and responsive to minute changes of voltage across the battery for controlling the grid bias of the rectifier to counteract such changes.

FRANK G. BEETEM.